United States Patent [19]
Matsuyama

[11] Patent Number: 5,811,017
[45] Date of Patent: Sep. 22, 1998

[54] CANTILEVER FOR USE IN A SCANNING PROBE MICROSCOPE AND METHOD OF MANUFACTURING THE SAME

[75] Inventor: Katsuhiro Matsuyama, Hachioji, Japan

[73] Assignee: Olympus Optical Co., Ltd., Tokyo, Japan

[21] Appl. No.: 645,655

[22] Filed: May 14, 1996

[30] Foreign Application Priority Data

May 16, 1995 [JP] Japan .................................. 7-117325

[51] Int. Cl.⁶ .............................................. H01L 21/306
[52] U.S. Cl. .......................... 216/11; 437/228; 250/306; 250/307
[58] Field of Search .............................. 216/11; 437/228; 250/306, 307

[56] References Cited

U.S. PATENT DOCUMENTS

| | | | |
|---|---|---|---|
| 4,943,719 | 7/1990 | Akamine et al. | 250/306 |
| 5,021,364 | 6/1991 | Akamine et al. | 437/228 |
| 5,319,961 | 6/1994 | Matsuyama et al. | 73/105 |
| 5,386,110 | 1/1995 | Toda | 250/216 |
| 5,444,244 | 8/1995 | Kirk et al. | 250/306 |
| 5,618,760 | 4/1997 | Soh et al. | 438/703 |

OTHER PUBLICATIONS

Catalog Sheet for OMCL Series Micro Cantilever, by Olympus Optical Co., Ltd., Tokyo, Japan, published at least as early as Mar. 30, 1995.

Catalog Sheet for OMCL Series Micro Cantilever, containing English language materials on p. 2 thereof, by Olympus Optical Co., Ltd., Tokyo, Japan, (published after Mar. 30, 1995 and before May 14, 1996).

T.R. Albrecht et al; "Atomic Resolution Imaging of a Non–conductor By Atomic Force Microscopy"; Oct. 1, 1987; pp. 2599–2602; J. Apply. Phys., vol. 62, No. 7.

T.R. Albrecht et al; "Microfabrication of Cantilever Styli For the Atomic Force Microscope"; Jul./Aug. 1990; pp. 3386–3396; J. Vac. Sci. Technol. vol. A8, No. 4.

S. Akamine et al; "Improved Atomic Force Microscope Images Using Microcantilevers With Sharp Tips"; Jul. 16, 1990; pp. 316–318; Appl. Phys. Lett. vol. 57, No. 3.

Catalog Sheet for OMCL Series Micro Cantilever, by Olympus Optical Co., Ltd., Tokyo, Japan.

Oyo Buturi vol. 64, No. 3, 1995, Tokyo, Japan, page including advertisement for OMCL Series Micro Cantilever made by Olympus Optical Co., Ltd., Tokyo, Japan.

*Primary Examiner*—R. Bruce Breneman
*Assistant Examiner*—Thomas Weingart
*Attorney, Agent, or Firm*—Frishauf, Holtz, Goodman, Langer & Chick

[57] ABSTRACT

A composite silicon-on-insulator substrate comprises first and second substrates and an oxide film interposed between them. The second substrate is partially removed, such that a lever-base section is formed. An oxide film is formed on the sides of the lever-base section. The second substrate has its thickness set to a predetermined value by wet anisotropic etching, such that a pre-lever section is formed and such that a probe-base section is formed at one end of the pre-lever section. An oxide film is formed on the pre-lever section and the probe-base section, such that a lever section with a desired thickness and a probe section with a sharpened tip are formed. A part of the first substrate is etched away, such that a support section is formed. The oxide film covering the lever section and the probe section is removed.

14 Claims, 6 Drawing Sheets

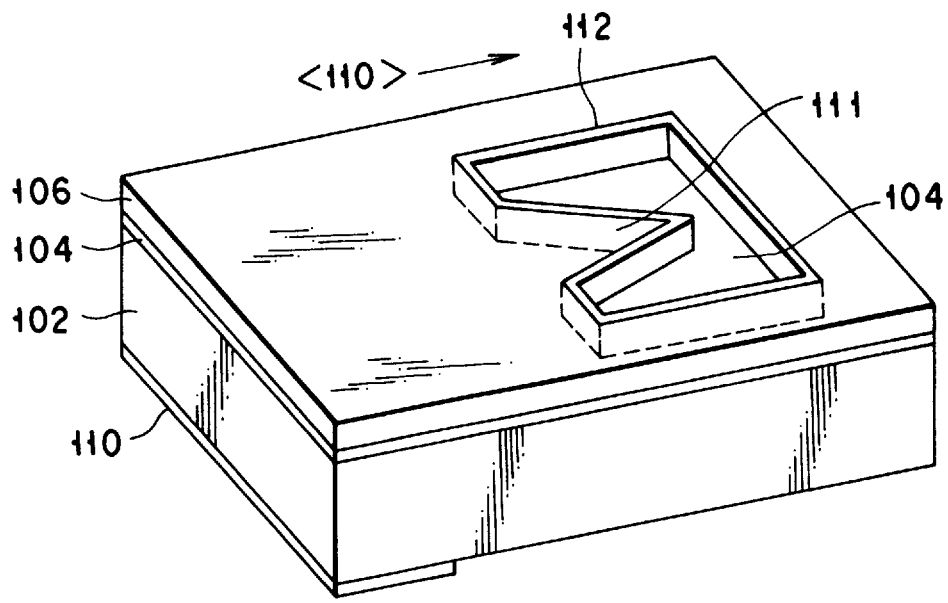
FIG. 2
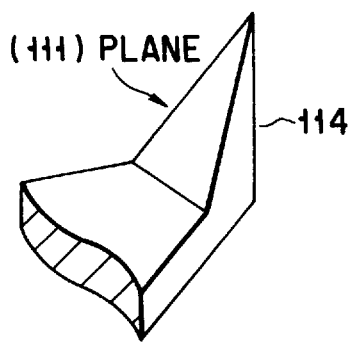
FIG. 3A
FIG. 3B
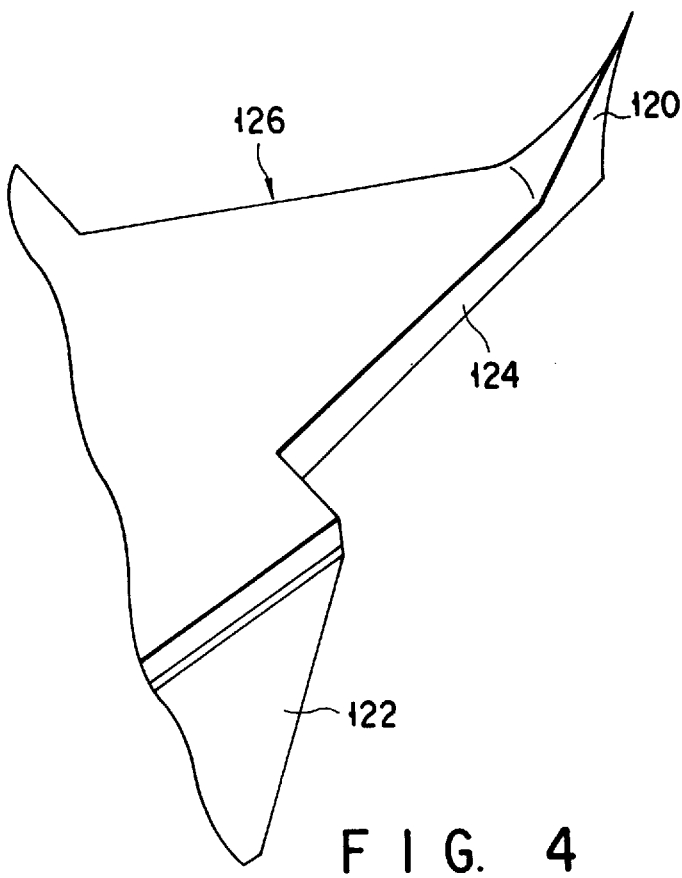
FIG. 4

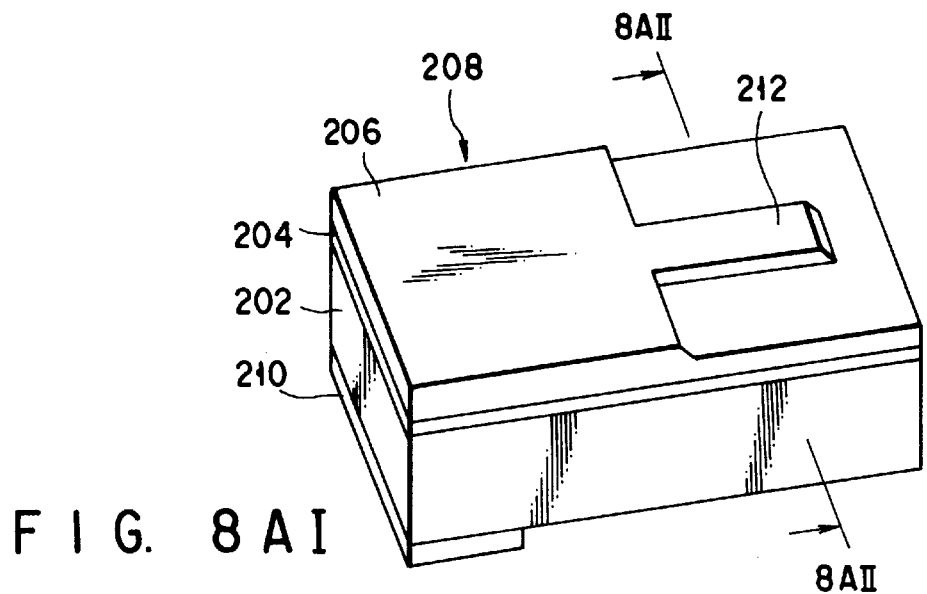
F I G. 8A I
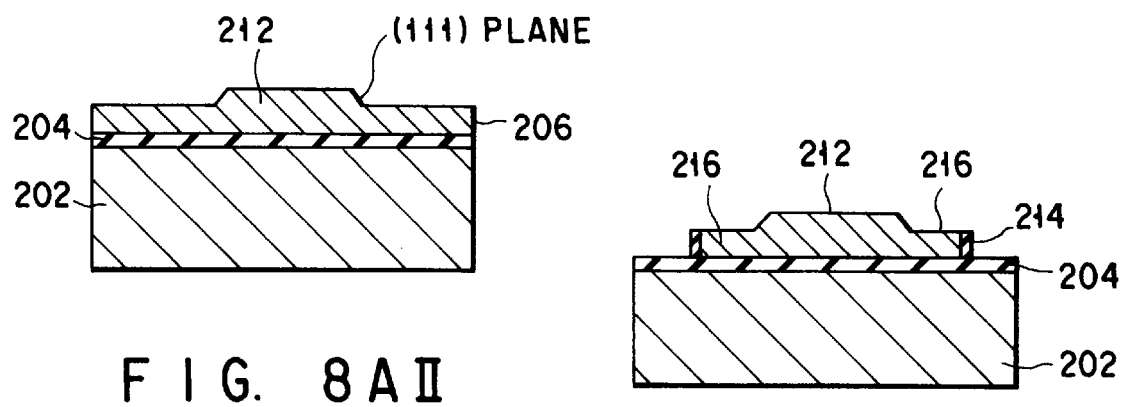
F I G. 8A II
F I G. 8B II
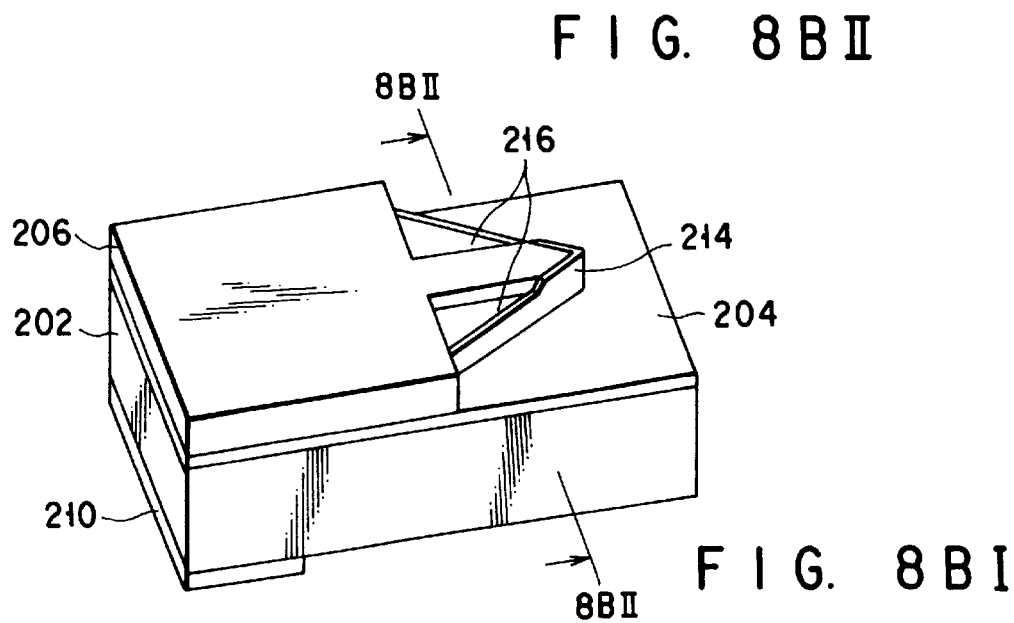
F I G. 8B I

FIG. 8CII

CANTILEVER FOR USE IN A SCANNING PROBE MICROSCOPE AND METHOD OF MANUFACTURING THE SAME

BACKGROUND OF THE INVENTION

1. Field of the Invention

The present invention relates to a cantilever for use in a scanning probe microscope, and also to a method of manufacturing the cantilever.

2. Description of the Related Art

Scanning probe microscopes (SPMs) capable of providing atomic-resolution are already used in practice. Scanning probe microscopes include a scanning tunneling microscope (STM) and an atomic force microscope (AFM), which are well known in the art.

An STM, capable of observing the surface configuration of an electrically conductive sample in the form of a three-dimensional image, comprises a cantilever with a pointed electrically conductive projection or probe at its free end. The probe is located near the sample surface, and a bias voltage is applied between the probe and the sample, both of which are electrically conductive. As a result, a tunnel current flows between the probe and the sample. The STM, detecting the tunnel current, scans the probe across the sample surface, so as to control the distance between the probe and the sample to maintain the tunnel current at a predetermined value. The tunnel current exponentially changes with the distance between the probe and the sample. An infinitesimal change in the distance would result in a great change of the tunnel current. An image of the sample surface with atomic resolution is formed from height and positional information of the probe with respect to the sample surface.

An AFM is capable of observing the surface configuration of an electrically insulating sample in the form of a three-dimensional image, whereas an STM cannot provide a three-dimensional image of the surface of an electrically insulating sample. The AFM comprises a flexible cantilever with a pointed electrically insulating probe at its free end. The probe is located near the surface of a sample. The free end of the flexible cantilever is displaced by the force which acts between the probe and the sample surface (e.g., atomic force or electrostatic force) and which depends upon the distance between the probe and the sample surface. The AFM, measuring the displacement of the free end of the cantilever electrically or optically, scans the probe across the sample surface, so as to control the distance between the probe and the sample to maintain the displacement of the free end of the cantilever at a predetermined value. The atomic force acting between the probe and the sample surface greatly changes with the distance between the probe and the sample. In other words, an infinitesimal change in the distance would cause a great change of the atomic force. An image of the sample surface with atomic resolution is formed from height and positional information of the probe with respect to the sample surface.

Thomas R. Albrecht and Calvin F. Quate proposed an $SiO_2$ cantilever made by a process of manufacturing semiconductor ICs, for use in scanning probe microscopes, in their thesis "Atomic Resolution Imaging of a Nonconductor by Atomic Force Microscopy," J. Appl. Pys. 62 (1987) 2599. Cantilevers of this type have been manufactured by an IC-manufacturing process and have been used in large numbers. This is because they can be made with micron-order precision and good reproducibility, and also at low cost thanks to the batch process employed.

Thomas R. Albrecht et al., "Microfabrication of Cantilever Styli for the Atomic Force Microscope," J. Vac. Sci. Technol. A8(4)3386, 1990 discloses a cantilever comprising a silicon nitride film (not an $SiO_2$ film). This cantilever has already been put to practical use. It has a length of about 50 to 200 $\mu$m and a thickens of about 0.5 to 1 $\mu$m and is shaped like a triangular or rectangular frame.

S. Akamine et al., "Improved Atomic Force Microscope Images Using Microcantilever with Sharp Tips," Appl. Phys. Lett. 57(3)316, 1990 discloses a cantilever which comprises a lever support and a lever section. The lever section is made of silicon nitride and extends from a lever support. Provided at the free end of the lever section is a probe section which is made of single crystal silicon. The probe section is a trigonal pyramid formed by means of wet anisotropic etching, using an aqueous solution of potassium hydroxide (KOH). Since the probe section is a trigonal pyramid, it has three edges which meet at one point, defining a very sharp tip.

U.S. Pat. No. 5,021,364 to S. Akamine et al. discloses a method for manufacturing a cantilever which comprises a lever section and a lever support supporting the lever section. According to the method of this patent the lever support is formed, then the lever section is formed into a shape, and finally a silicon member is partially removed by wet anisotropic etching, such that a probe is formed at the free end of the lever section. The sharpness of the probe tip is determined by the surface precision of the (111) planes, which are exposed by the wet anisotropic etching.

Hence, the radius of curvature of the probe tip depends on the type of the etchant solution which has been used in the wet anisotropic etching and also on the various conditions in which the etching has been performed. The etchant may be an aqueous solution of tetramethylammonium hydroxide (TMAH), not an aqueous solution of potassium hydroxide, to prevent contamination of the clean room in which the cantilever is manufactured. In this case, the probe section will have an undesirable shape; it will not be not shaped like an ideal trigonal pyramid. An SPM incorporating a cantilever having such a probe section cannot provide high-resolution images.

With the method disclosed in said U.S. Pat. No. 5,021,364, it is difficult to manufacture a cantilever with a lever section shaped like anything other than a triangle. Since the lever section is made of an ion-implanted silicon layer, its thickness cannot range over a broad range. Therefore, the method cannot provide a cantilever with a lever section which serves to accomplish SPM measurement such as scanning tunneling microscopy, atomic force microscopy and lateral force microscopy.

To enhance the resolution of microscopic images it is required to use a probe section having a tip of a small curvature of radius and a lever section having characteristics required for SPM measurement. It is therefore desired that a cantilever be provided which has a probe section having a sharp tip and which has a lever section desirable for SPM measurement.

SUMMARY OF THE INVENTION

An object of the present invention is to provide a cantilever for use in a scanning probe microscope (SPM), which comprises a probe section having a tip sharp enough to accomplish high-resolution SPM measurement.

Another object of the invention is to provide a cantilever for use in a scanning probe microscope (SPM), which comprises a lever section having a thickness and a shape, both desirable for high-resolution SPM measurement.

Still another object of the invention is to provide a method of manufacturing a cantilever which comprises a lever section having any thickness desired and any shaped desired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view of the SOI substrate shown in FIG. 1B;

FIG. 3A is an enlarged perspective view of the probe section shown in FIG. 1C;

FIG. 3B is an enlarged perspective view of the probe section shown in FIG. 1E;

FIG. 4 is a perspective view of a cantilever manufactured by the method explained in conjunction with FIGS. 1A to 1E;

DETAILED DESCRIPTION OF THE PREFERRED EMBODIMENTS

A method of manufacturing a cantilever for use in a scanning probe microscope, which is the first embodiment of the invention, will be explained with reference to FIGS. 1A to 1E.

Figure 1A:
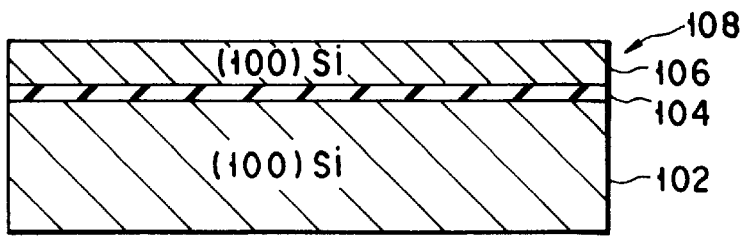
FIGS. 1A to 1E are sectional views, explaining a method of manufacturing a cantilever for use in a scanning probe microscope, according to a first embodiment of the invention.

First, a composite SOI (Silicon On Insulator) substrate 108 is prepared. As shown in FIG. 1A, the SOI substrate 108 comprises a first silicon substrate 102 with a major surface of a (111) plane, a silicon oxide film 104 and a second silicon substrate 106 with a major surface of a (111) plane. The substrate 108 has been produced by first forming a silicon oxide film 104 on the major surface of the first silicon substrate 102 and then bonding the second silicon substrate 106 to the silicon oxide film 104. The first silicon substrate 102 has a thickness of, for example, 500 μm, the silicon oxide film 104 a thickness of, for example, 1 μm, and the second silicon substrate 106 a thickness of, for example, 20 μm.

Figure 1B:
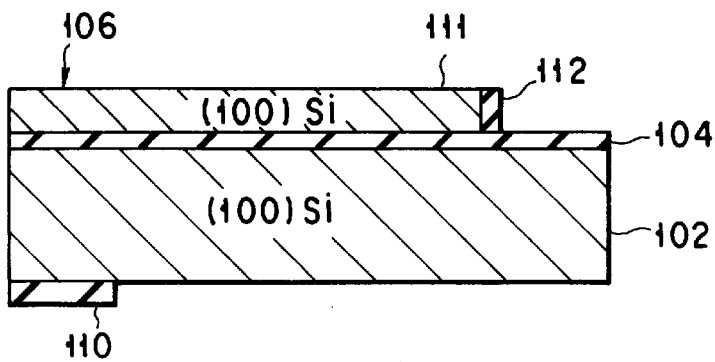

Next, as shown in FIG. 1B, an etching mask 110 is formed on the lower surface of the first silicon substrate 102, by forming an insulating film of silicon oxide or silicon nitride on the lower surface of the substrate 102 and then patterning the insulating film. The mask 110 will be used to form a supporting section as will be described later.

The second silicon substrate 106 is partially removed by photolithography and dry etching, until the silicon oxide film 104 is exposed, such that a lever-base section 111 is formed, as shown in FIG. 1B and FIG. 2. The dry etching is preferably RIE (Reactive. Ion Etching) using plasma. Particular, use of RIE using inductively coupled plasma is more effective for controlling a shape of the lever-base section. The lever-base section 111 has an isosceles triangle shape corresponding to that of a lever section to be manufactured. The bisector of the vertical angle of the isosceles triangle extends along <110> axis. Stated in another way, a portion of the second silicon substrate 106 is removed, forming in the substrate 106 an opening with a shape corresponding to that of the lever-base section, such that the lever-base section 111 is formed, which will be formed into a lever section 116.

A silicon oxide wall 112 is formed on the side surfaces of the opening made in the silicon oxide substrate 106. The silicon oxide wall 112 will effectively serve to form the probe section of the cantilever, as will be described later.

Figure 1C:
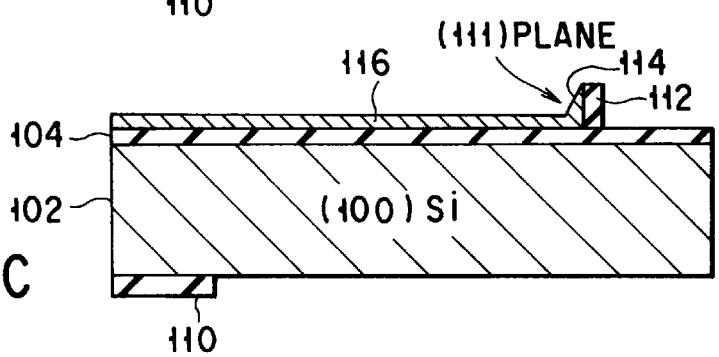

As illustrated in FIG. 1C, the second silicon substrate 106 is subjected to wet anisotropic etching and has its thickness reduced to a predetermined value. The lever-base section 111 of the substrate 106 is thereby formed into a pre-lever section 116. Further, the tip of the lever-base section 111 is processed, forming a probe-base section 114 with a trigonal pyramid shape, which will be formed into a probe section 120. Used in the wet anisotropic etching is an etchant having a prescribed concentration, such as an aqueous solution of potassium hydroxide (KOH), an aqueous solution of tetramethylammonium hydroxide (TMAH) or ethylenediamine pyrocatechol and water (generally known as EDP or EPW). Wet anisotropic etching can hardly etch a silicon substrate at the (111) plane, though it can well etch it at the (100) plane. Therefore, the second silicon substrate 106 is etched such that the tip of the lever-base section 111 is exposed at the (111) plane. As a result, a probe-base section 114 is formed which is shaped like a trigonal pyramid as is shown in FIG. 3A.

Thus it is possible to form a probe section at the distal end of the lever (i.e., the tip of the lever-base section 111), without using a mask designed specifically for forming a probe section. That is, the probe-base section 114 is formed at the distal end of the lever-base section by a self-aligned process. The probe-base section 114 will be later sharpened and finally formed into the probe section 120 shown in FIG. 3B.

Figure 1D:
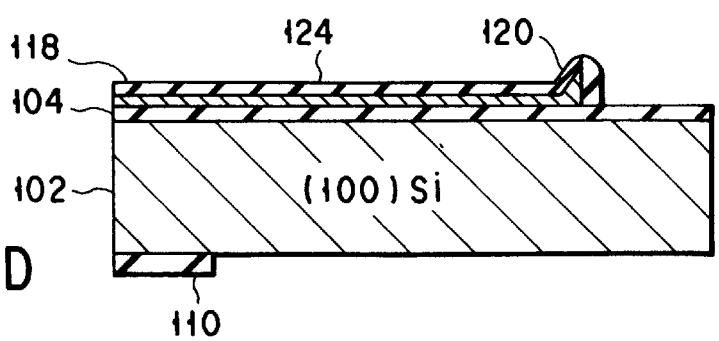

Next, as shown in FIG. 1D, a silicon oxide film 118 is formed, covering the probe-base section 114 (a trigonal pyramid) and the triangular lever section 116. More precisely, the film 118 is formed by oxidizing the surface of the remaining part of the second silicon substrate 106, which includes the probe-base section 114 and the lever section 116, in, for example, a thermal diffusion furnace at a temperature between 900° and 1000° C., preferably at 950° C. The growing speed of the silicon oxide film depends upon the locations of the probe-base section 114. At the tip of the probe-base section 114, the closer to the tip, the slower the growing speed is. The probe-base section 114, therefore is more oxidized at the middle than at the tip. As a result, the probe-base section 114 is ultimately sharpened and formed into a sharp probe section 120, as illustrated in FIG. 3B. That part of the pre-lever section 116 which remains not oxidized constitutes a lever section 124 with a desired thickness.

Figure 1E:
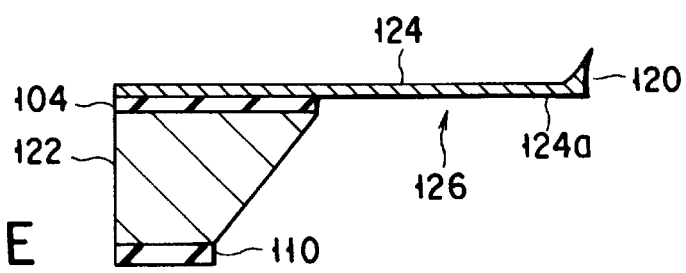

As shown in FIG. 1E, the first silicon substrate 102 is etched from its lower surface by means of wet anisotropic etching, whereby a support section 122 is formed. Thereafter, an aqueous solution of hydrogen fluoride is applied, thereby removing the silicon oxide films covering the probe section 120 and the lever section 124 (i.e., a part of the silicon oxide film 104, the silicon oxide wall 112, and the silicon oxide film 118). A cantilever 126 is thereby manufactured.

The cantilever 126 comprises the probe section 120 and the lever section 124. The probe section 120 is made of single crystal silicon and having a sharp tip. The lever section 124 has a desired thickness. More specifically, the lever section 124 has a thickness of, for example, 3 $\mu$m. The probe section 120 has a height of, for example, about 10 $\mu$m, excluding the thickness of the lever section 124. The sum of the height of the probe section 120 and the thickness of the lever section 124 depends on the thickness of the second silicon substrate 106. The thickness of the lever section 124 depends on how much the second silicon substrate 106 is etched by means of wet anisotropic etching. Hence, the thickness of the second silicon substrate 106 may be changed in order that the lever section 124 has a desired thickness.

The cantilever 126 thus manufactured may be subjected to an additional process, in which a metal film is coated on that surface 124a of the lever section 124 which faces away from the probe section 120. The metal film serves as a reflector for measuring the displacement of the probe section 120.

Figure 5:
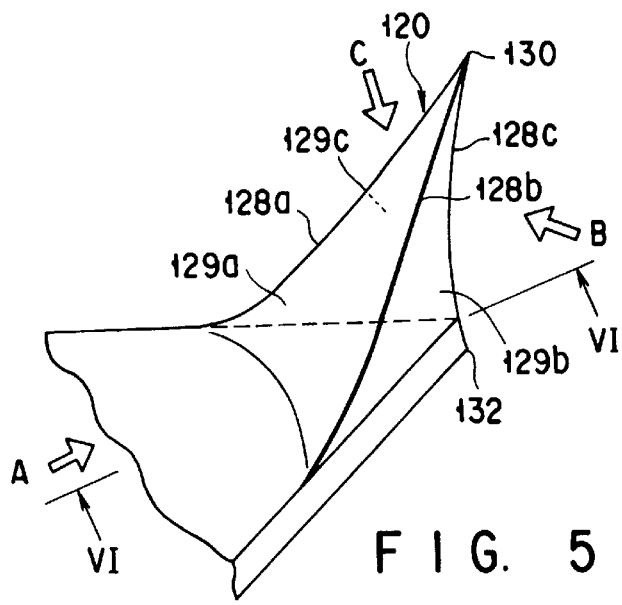
FIG. 5 is an enlarged perspective view of the probe section shown in FIG. 4.

As illustrated in FIG. 4, the lever section 124 made of single crystal silicon is triangular and has at its free end the probe section 120 which is a sharpened trigonal pyramid. The lever section 124 has its proximal end secured to the support section 122. As seen from FIG. 5, the probe section 120 has three edges 128a, 128b and 128c which are lines curved inwards, meeting at the distal end 130 of the section 120. This is because the section 120 has been formed by thermally oxidizing a trigonal pyramid of single crystal silicon at a relatively low temperature between 900° and 1000° C.

Figure 5A:
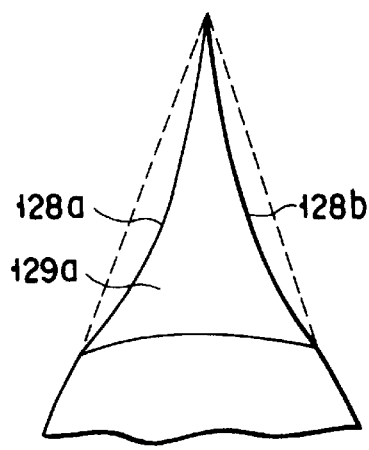
FIG. 5A is a view of the probe section shown in FIG. 5, as seen in the direction of arrow A.
Figures 5B, 5C:
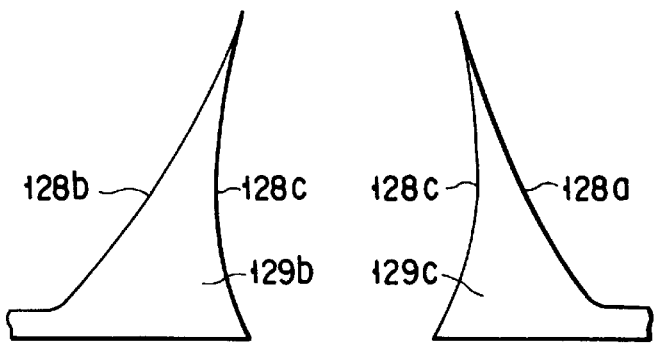
FIG. 5B is a side view of the probe section shown in FIG. 5, as seen in the direction of arrow B.
FIG. 5C is another side view of the probe section shown in FIG. 5, as seen in the direction of arrow C.

All of a surface 129a between the edges 128a and 128b as shown in FIG. 5A, a surface 129b between the edges 128b and 128c as shown in FIG. 5B, and a surface 129c between the edges 128c and 128a as shown in FIG. 5C are curved inwards. The probe section 120, therefore, has a higher aspect ratio on closing to the distal end 130. The distal end 130 of the section 120 has a radius of curvature as small as 10 nm or less.

The method explained above can provide a cantilever for use in a scanning-probe microscope, which has at its distal end a probe section made of single crystal silicon. The probe section has three arcuate edges curved inwards and meeting at one point. The probe section therefore has a higher aspect ratio than a probe section which is nothing more than a trigonal pyramid. Comprising a probe section having a high aspect ratio the cantilever can accomplish high-resolution SPM measurement. For the same reason, the cantilever is effective, particularly in AFM measurement of a sample which has tiny pits in its surface, like an optical disk.

In the method described above, wet anisotropic etching is conducted on the second silicon substrate, thereby forming a probe section and a lever-base section. The extent to which the second silicon substrate is etched determines the thickness of the lever section. It therefore suffices to use a silicon substrate having an appropriate thickness as the second silicon substrate, so that the lever section may have any thickness suitable for the purpose for which the cantilever is utilized. For example, a cantilever with a thick lever section has a high resonance frequency and is useful for non-contact mode AFM measurement in which the lever section is vibrated. Since the lever section can be formed with a thickness over a broad range, the cantilever can easily be modified to serve in various types of SPM measurement.

Similarly, the height of the probe section is determined by the thickness of the second silicon substrate and the etched extent of the second silicon substrate in the etching process. Therefore, a probe section with any desired height may be formed, merely by selecting the second substrate with an appropriate thickness.

Figure 6:
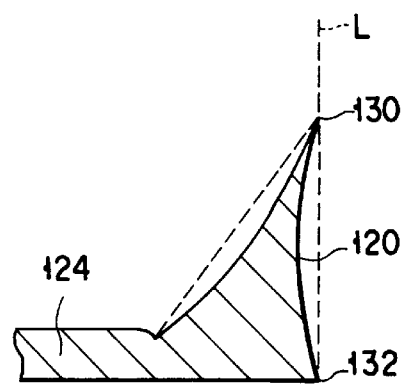
FIG. 6 is a sectional view of the cantilever, taken along line VI—VI in FIG. 5.

As shown in FIG. 6, the distal end 130 of the probe section 120 is located substantially on a line L which is perpendicular to the lever section section 124 and which passes the apex of the triangular lever section 124. Hence, the position of the distal end 130 may be noticed by detecting the position of the apex 132 with an optical system which has an optical axis coincident with the vertical line line L. It follows that such an optical system helps to facilitate the positioning of the probe section 120 with respect to a sample.

Figure 7:
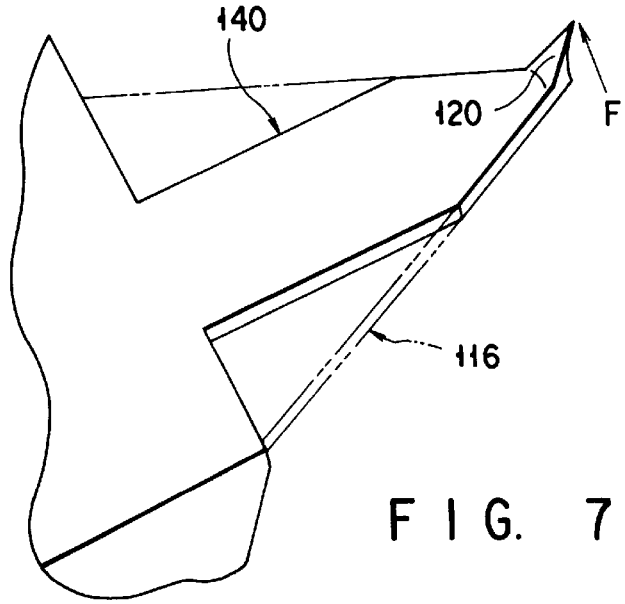
FIG. 7 is a perspective view of a modification of the cantilever, manufactured by a method which is a modification of the method explained in conjunction with FIGS. 1A to 1E.

The method described above can be applied to manufacture a modified cantilever 140 shown in FIG. 7, which has a pentagonal lever section. To be more specific, after the manufacturing step shown in FIG. 1C, proximal parts 116 of the triangular lever section (indicated by phantom lines in FIG. 7) are removed by means of photolithography and etching (either dry etching or wet etching). The lever section 116 is thereby shaped into a pentagonal one 140. Thereafter, the unfinished product undergoes the steps of FIGS. 1D and 1E, whereby a cantilever shown in FIG. 7 of single crystal silicon is manufactured. In other words, a cantilever having a rectangular proximal portion and a triangular distal portion is manufactured by adding photolithography and etching to the method explained above. The photolithography and the etching may be performed after the manufacturing step shown in FIG. 1D.

The cantilever 140 thus manufactured can easily be twisted when applied with a force acting sideways as indicated by arrow F. Easily twisted, the cantilever 140 is sensitive enough to provide LFM (lateral force microscope) measurement which observes the surface configuration and frictional force of a sample.

In the modified method, too, the extent to which the second silicon substrate is etched determines the thickness of the lever section of the modified cantilever 140. A cantilever 140 with a high resonance frequency is manufactured by making the lever section thick. Furthermore, the lever section of the cantilever 140 has a greater quality factor (Q) than the triangular lever section 124 (FIG. 4) since it is almost rectangular, rather than pentagonal, and thus encounters a lower air resistance. Thus, the modified cantilever 140 is sufficiently sensitive to accomplish non-contact mode AFM measurement.

As described above, the cantilever according to the first embodiment has a triangular lever section, and the modified cantilever has a pentagonal lever section. Nevertheless, the lever section is not limited to a triangular one or a pentagonal one in the present invention.

The lever section may be processed to have a desired shaped, either after the probe-base section has been formed or after the probe section has been formed, because the support section is formed last. Were the support section formed first, a portion, which should be processed to form the lever section, has a thickness of only about 20 μm. There would be a high probability that the portion would be broken while being processed. In the method of this invention, on the contrary, a portion, which should be processed to form the lever section, has a sufficient thickness. Other words, the portion to be processed is still supported by the first silicon substrate which has not been processed. Therefore, there would be less probability that the portion is broken while processed.

A method of manufacturing a cantilever for use in a scanning probe microscope, which is the second embodiment of the invention, will be explained with reference to FIGS. 8AI and 8AII, FIG. 8BI and 8BII, FIGS. 8CI and 8CII, and FIG. 8D.

At first, an SOI substrate 208 is prepared in the same way as the SOI substrate 108 used in the first embodiment. As can be understood from FIG. 8AII, the SOI substrate 208 comprises a first silicon substrate 202, a silicon oxide film 204 and a second silicon substrate 206.

As shown in FIG. 8AI, an etching mask 210 is formed on the lower surface of the first silicon substrate 202, by forming an insulating film of silicon oxide or silicon nitride on the lower surface of the substrate 202 and then patterning the insulating film. The mask 210 will be used to form a supporting section as will be described later.

As shown in FIGS. 8AI and 8AII, FIG. 8AII showing a sectional view taken along line 8AII—8AII in FIG. 8AI, the second silicon substrate 206 is partially removed by photolithography and wet anisotropic etching, so that a rectangular lever-base section 212 is formed. The sides of the lever-base section 212 are of (111) plane which may hardly be etched. The thickness of the lever-base section 212 determines the thickness of the lever section which will be formed by further processing the second silicon substrate 206. This means that the lever section may easily be formed with any thickness desired, merely by adjusting the extent to which the second substrate 206 is etched.

Next, as shown in FIGS. 8BI and 8BII, FIG. 8BII showing a sectional view taken along line 8BII—8BII in FIG. 8BI, a part of the second silicon substrate 208 is removed by photolithography and dry etching, until a part of the silicon oxide film 204 is exposed, so that an isosceles triangular portion is thereby formed. The triangular portion has a vertex located on a central axis of the lever-base section 212, and the vertical angle is symmetrical with respect to <110> axis of the central axis, as in the first embodiment. A silicon oxide wall 214 is then formed on the side of the triangular portion.

Figure 8C:
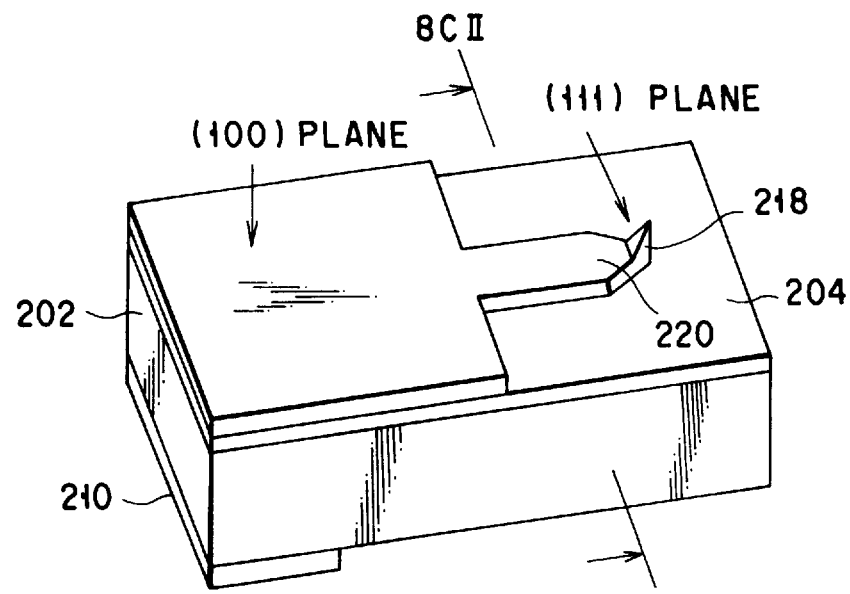
FIGS. 8AI and 8AII, FIG. 8BI and 8BII, FIGS. 8CI and 8CII.
FIGS. 8D are views explaining a method of manufacturing a cantilever for use in a scanning probe microscope, according to a second embodiment of the invention.

As shown in FIGS. 8CI and 8CII, FIG. 8CII showing a sectional view taken along line 8CII—8CII in FIG. 8CI, the second silicon substrate 206 is subjected to wet anisotropic etching, having its surface uniformly etched, maintaining a difference in height between the lever-base section 212 and its side portions 216. This etching is continued until the portions 216 are removed entirely, and the corresponding portion of the silicon oxide film 204 is exposed. As a result of this, the lever-base section 212 is formed into a pre-lever section 220 with a trapezoidal section. Due to the existence of the silicon oxide wall 214, at the triangular distal portion of the lever-base section 212, the (111) plane is exposed. A probe-base section 218 is thereby formed, which has a trigonal pyramid shape and which will be formed into a probe section.

In FIGS. 8CI and 8CII, the silicon oxide wall 214 is not shown, in order to represent the shape of the pre-lever section 220 formed by the wet anisotropic etching. An additional process may be added. In this case, after the wet anisotropic etching, an aqueous solution of hydrogen fluoride or the like may be applied to remove the silicon oxide all 214, so that the structure shown in FIGS. 8CI and 8CII may be obtained.

Thereafter, as in the first embodiment, the surface of the second silicon substrate 206 is oxidized in a thermal diffusion furnace at a relatively low temperature. A silicon oxide film is thereby formed, covering the remaining part of the second silicon substrate 206 (i.e., the probe-base section 218 and the pre-lever section 220), as is illustrated in FIG. 1D. The pre-lever section 220 becomes a lever section 224 having a desired thickness, and the probe-base section 218 becomes a sharpened probe section 226.

Figure 8D:
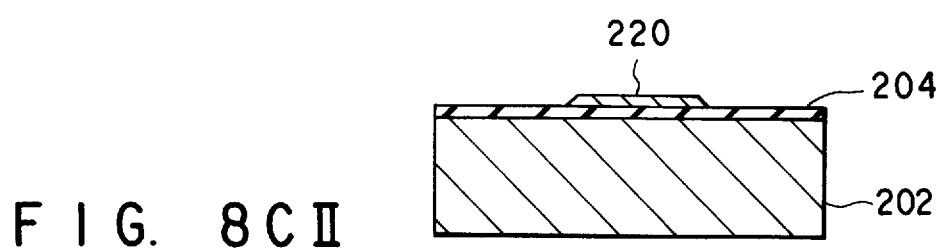
Figure 8D:
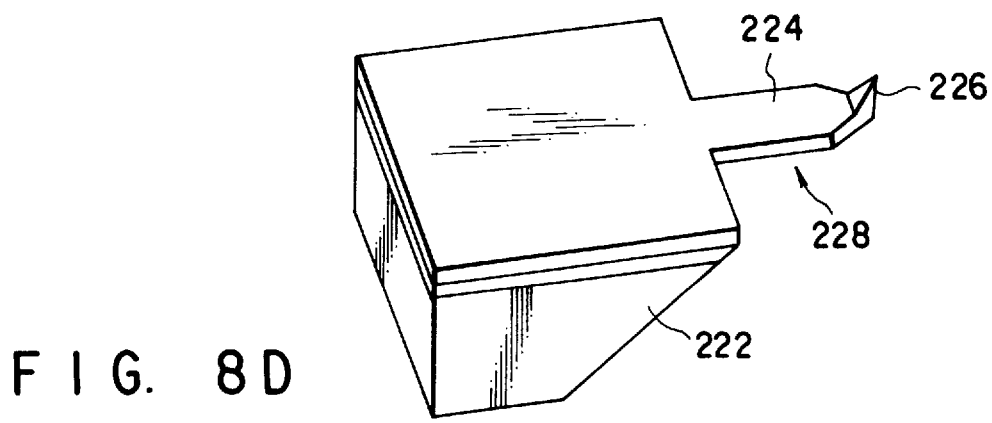

Then, as shown in FIG. 8D, the first silicon substrate 202 is etched from its lower surface by means of wet anisotropic etching, whereby a support section 222 is formed. Thereafter, an aqueous solution of hydrogen fluoride is applied, thereby removing the silicon oxide films covering the lever section 224 and the probe section 226. More precisely, a part of the silicon oxide film 204, the silicon oxide wall 214, and the silicon oxide film formed on the substrate 206 by thermal oxidation are removed, exposing the sharpened probe section 226 and the lever section 224.

The method according to the second embodiment can provide a cantilever for use in a scanning probe microscope, which has at its distal end a probe section 226 made of single crystal silicon with three arcuate edges curved inwards and meeting at one point. The probe section 226 therefore has a higher aspect ratio than a probe section which is nothing more than a trigonal pyramid. Comprising a probe section having a high aspect ratio, the cantilever allows to accomplish high-resolution SPM measurement.

Since the lever-base section 212 is formed prior to the probe-base section 218, the thickness of the pre-lever section 220 is hardly influenced by the extent to which the second substrate 206 is etched to form the probe-base section 218. The thickness of the pre-lever section 220 can therefore be set at any value desired. As a result, the method according to the second embodiment can manufacture a cantilever having an elastic constant and a resonance frequency which are very similar to design values.

Made of single crystal silicon, the cantilever made by the method according to each embodiment has electrically insulation. Electrical conductive layers may be provided on the lever section and probe section by means of ion implantation. In this case, the cantilever can be used for STM measurement on a sample or to measure electric values of a sample (e.g., surface charge). Alternatively, the cantilever may have a sensor suitable for AFM examination, which includes a piezoresistive layer provided on the lever section. The thinner the piezoelectric layer, the more accurately can the sensor detect warp and twist of the lever section. Preferably, the piezoresistive layer has a thickness of 0.2 μm or less.

How an electrically conductive layer is formed by ion implantation on the lever section and probe section of the cantilever will be explained, with reference to FIGS. 9A and 9B.

In the first embodiment, for example, the ion implantation is performed after the step, as shown in FIG. 1D, of thermally oxidizing the surface of the second silicon substrate 206 at a low temperature, such that a silicon oxide film 118 is formed and that the probe-base section 114 and the pre-lever section 116 are formed into the sharpened probe section 120 and the lever section 124, respectively.

Figure 9A:
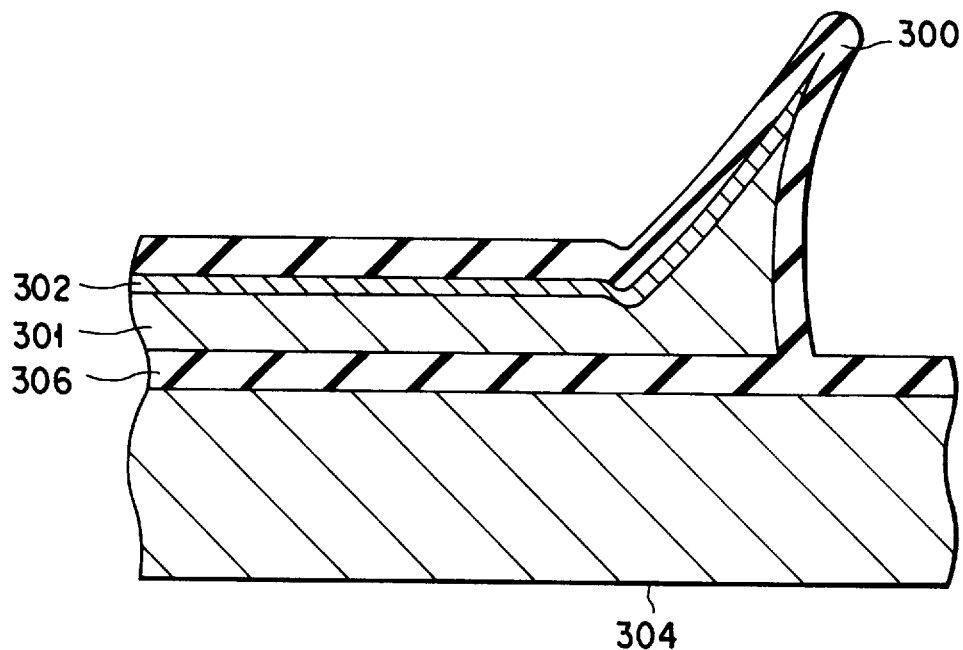
FIG. 9A is a sectional view of a probe section containing impurity injected through a silicon oxide film.

Then, as shown in FIG. 9A, thermal oxidation is carried out at a low temperature, forming a silicon oxide film 300. A cantilever 301 is thereby provided inside the silicon oxide film 300. The cantilever 301 has a sharpened probe section and a lever section having a desired thickness. Ions of an impurity such as boron are implanted into the cantilever 301 through the silicon oxide film 300, forming an electrically conductive layer 302. At this time, the film 300 functions as a passivation film.

Figure 9B:
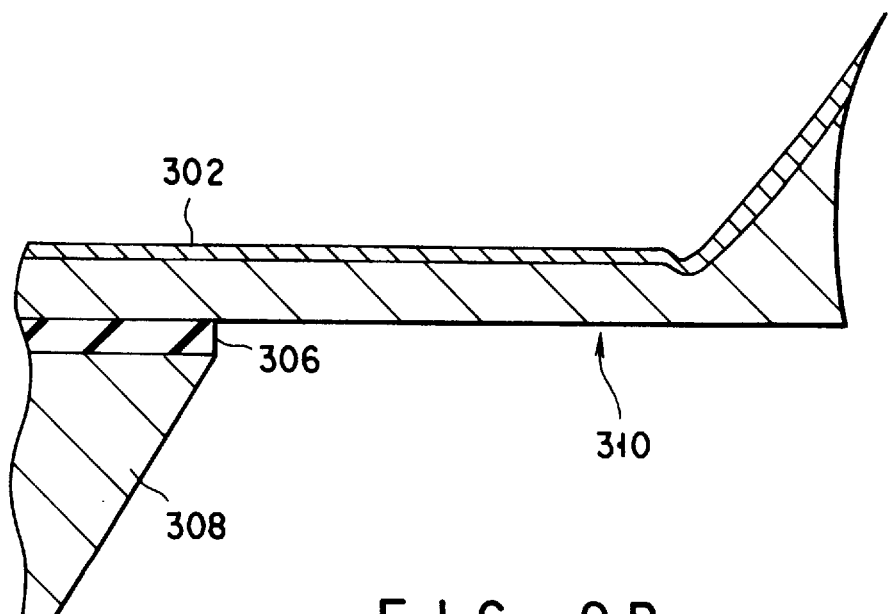
FIG. 9B is a sectional view of a cantilever comprising an electrically conductive layer.

Thereafter, as shown in FIG. 9B, the first silicon substrate 304 is etched from its lower surface by means of wet anisotropic etching, whereby a support section 308 is formed. Then, an aqueous solution of, for example, hydrogen fluoride is applied, thereby removing a part of the silicon oxide film 300 and a silicon oxide film 306 which has been interposed between the cantilever 301 and the first silicon substrate 304. A cantilever 310 having an electrically conductive layer 302 is thereby manufactured.

In the second embodiment, too, an electrically conductive cantilever can be manufactured in the same way as in the first embodiment—that is, by forming an electrically conductive layer on a cantilever by ion implantation after the surface of the second silicon substrate 206 has been thermally oxidized.

The impurity ion-implanted is not limited to boron. Any other impurity may be used, provided that it will form an electrically conductive layer when ion-implanted into the surface of the second silicon substrate.

The cantilever having an electrically conductive layer on the probe section can be used to achieve not only AFM measurement, but also STM measurement. That is, the cantilever can be used for AFM measurement and STM measurement at the same time.

Were the electrically conductive layer formed by coating, the distal end of the probe section should have its radius of curvature increased. On the contrary, in the present method, no deformation of the probe section takes place with the cantilever since the conductive layer has been formed by means of ion implantation.

Additional advantages and modifications will readily occur to those skilled in the art. Therefore, the invention in its broader aspects is not limited to the specific details, and representative devices and methods shown and described herein. Accordingly, various modifications may be made without departing from the spirit or scope of the general inventive concept as defined by the appended claims and their equivalents.

For instance, the material of the cantilever is not limited to single crystal silicon which is used in the embodiments described above. Instead, any other semiconductor material may be used in the present invention.

What is claimed is:

1. A method of manufacturing a cantilever for use in a scanning probe microscope, comprising a support section, a lever section extending from the support section, and a probe section provided at a free end of the lever section, said method comprising the steps of:

preparing a composite silicon-on-insulator substrate which includes first and second semiconductor substrates and an intermediate oxide film interposed between the first and second semiconductor substrates;

removing a part of the second semiconductor substrate until the intermediate oxide film is exposed, such that a lever-base section is formed, which will be formed into a lever section;

forming an oxide film on sides of the lever-base section;

removing the second semiconductor substrate by wet anisotropic etching, reducing a thickness of the second semiconductor substrate so that on the lever-base section a probe-base section is formed, which probe-base section will be formed into a probe section;

forming an oxide film on an exposed surface of the second semiconductor substrate by thermal oxidation, such that the lever section and the probe section are formed;

removing a part of the first semiconductor substrate, such that a support section is formed; and removing the oxide films from at least the lever section and the probe section.

2. A method according to claim 1, wherein said lever-base section is triangular, having an apex and a base which correspond to the free end and proximal end of said lever section, respectively.

3. A method according to claim 2, further comprising a step of removing a part of said lever-base section, such that said lever-base section is formed into a shape corresponding to said lever section.

4. A method according to claim 3, wherein said lever section comprises a rectangular proximal part and a triangular distal part.

5. A method according to claim 1, further comprising a step of forming an electrically conductive layer on said lever section.

6. A method according to claim 5, wherein said electrically conductive layer comprises a piezoresistive layer.

7. A method according to claim 1, further comprising a step of forming an electrically conductive layer on both said lever section and said probe section.

8. A method according to claim 7, wherein said electrically conductive layer comprises a piezoresistive layer.

9. A method of manufacturing a cantilever for use in a scanning probe microscope, comprising a support section, a lever section extending from the support section, and a probe section provided at a free end of the lever section, said method comprising the steps of:

preparing a composite silicon-on-insulator substrate which includes first and second semiconductor substrates and an intermediate oxide film interposed between the first and second semiconductor substrates;

removing a surface portion of the second semiconductor substrate, reducing a thickness of said second semiconductor substrate so that a lever-base section is formed, which lever-base section will be formed into a lever section;

removing a part of said second semiconductor substrate until the intermediate oxide film is exposed, and forming an oxide film on sides of the lever-base section;

removing the second semiconductor substrate by wet anisotropic etching, reducing a thickness of the second semiconductor substrate so that on the lever-base section a probe-base section is formed, which probe-base section will be formed into a probe section;

forming an oxide film on an exposed surface of the second semiconductor substrate by thermal oxidation, such that the lever section and the probe section are formed;

removing a part of the first semiconductor substrate, such that a support section is formed; and removing the oxide films from at least the lever section and the probe section.

10. A method according to claim 9, wherein said lever section comprises a rectangular proximal part and a triangular distal part.

11. A method according to claim 9, further comprising a step of forming an electrically conductive layer on said lever section.

12. A method according to claim 11, wherein said electrically conductive layer comprises a piezoresistive layer.

13. A method according to claim 9, further comprising a step of forming an electrically conductive layer on both said lever section and said probe section.

14. A method according to claim 13, wherein said electrically conductive layer comprises a piezoresistive layer.

* * * * *